(12) United States Patent
Rosensweig et al.

(10) Patent No.: US 6,543,782 B1
(45) Date of Patent: Apr. 8, 2003

(54) NON-BURSTING FERROFLUID SEAL

(75) Inventors: Ronald E. Rosensweig, Summit, NJ (US); Kuldip Raj, Merrimack, NH (US); Thomas J. Black, Jr., Merrimak, NH (US)

(73) Assignee: Ferrotec (USA) Corporation, Nashua, NH (US)

( * ) Notice: Subject to any disclaimer, the term of this patent is extended or adjusted under 35 U.S.C. 154(b) by 59 days.

(21) Appl. No.: 09/832,527

(22) Filed: Apr. 11, 2001

(51) Int. Cl.[7] .............................................. F16J 15/43
(52) U.S. Cl. ...................................... 277/410; 277/411
(58) Field of Search ................................. 277/410, 411

(56) References Cited

U.S. PATENT DOCUMENTS

| | | | | |
|---|---|---|---|---|
| 4,445,696 A | * | 5/1984 | Raj et al. ..................... | 277/410 |
| 4,605,233 A | * | 8/1986 | Sato ............................ | 277/410 |
| 5,340,122 A | * | 8/1994 | Toboni et al. ............... | 277/410 |
| 5,593,164 A | * | 1/1997 | Mraz et al. .................. | 277/410 |
| 5,675,199 A | * | 10/1997 | Miyakoshi et al. .......... | 277/410 |
| 5,704,613 A | * | 1/1998 | Holtkamp .................... | 277/302 |
| 5,799,951 A | * | 9/1998 | Anderson et al. ........... | 277/301 |

* cited by examiner

*Primary Examiner*—Anthony Knight
*Assistant Examiner*—E Peavey

(57) ABSTRACT

Magnetic fluid seals containing housings, magnets, pole pieces, gaps, magnetic fluids, shafts and bearings of standard type are modified to permit operation at two levels of magnetic intensity in the gaps. During exposure to the operating pressure difference that a seal is designed to withhold, the magnetic field intensity in the gaps is maintained at a relatively low intensity. Subsequently, the magnetic field intensity in the gaps is increased to yield burst-free operation. Various embodiments for adjusting the magnetic field intensity are disclosed. These include: magnetic fluid seal with a variable magnet to pole-block spacing; seal with hollow-shaft flux intensifier; seal with surrounding flux diverter; and seal with an internal magnetic coil that furnishes opposing magnetomotive force.

28 Claims, 8 Drawing Sheets

NONBURSTING SEAL FOLLOWING PUMPDOWN

SEAL FOLLOWING MAGNETIC FIELD INTENSIFICATION

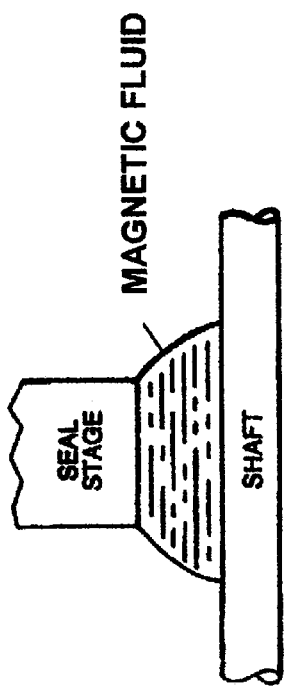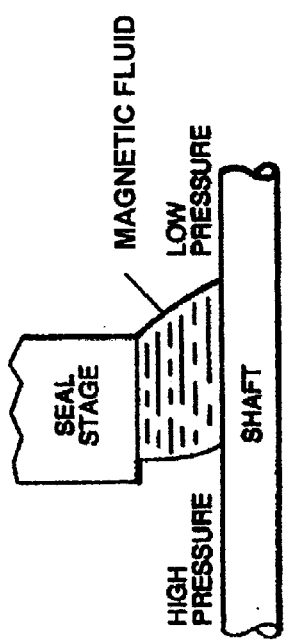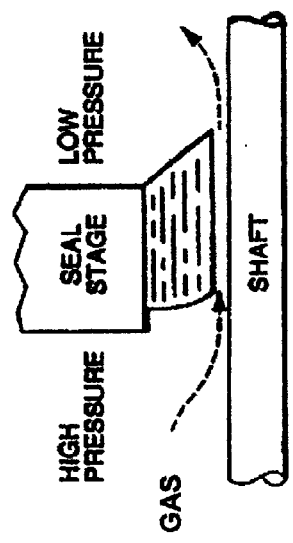

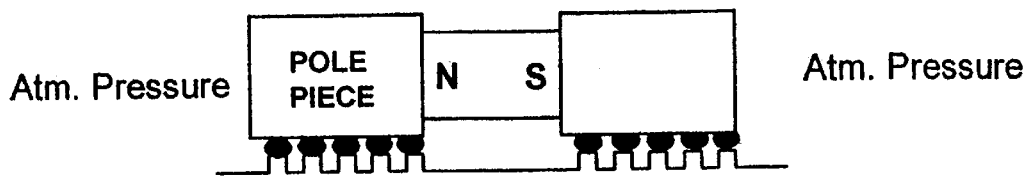
FIG. 3A – STANDARD SEAL
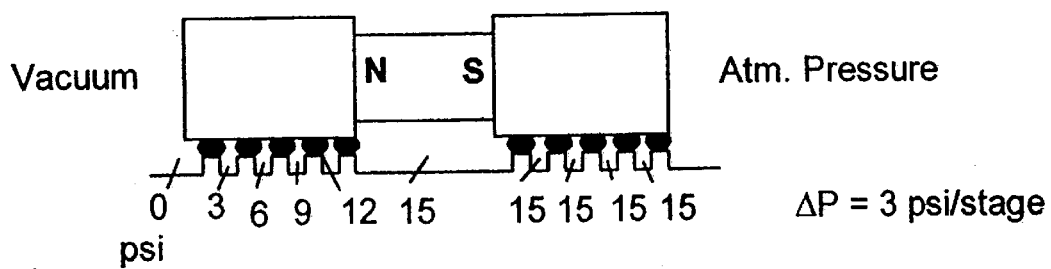
ΔP = 3 psi/stage
FIG. 3B – SEAL FOLLOWING PUMPDOWN
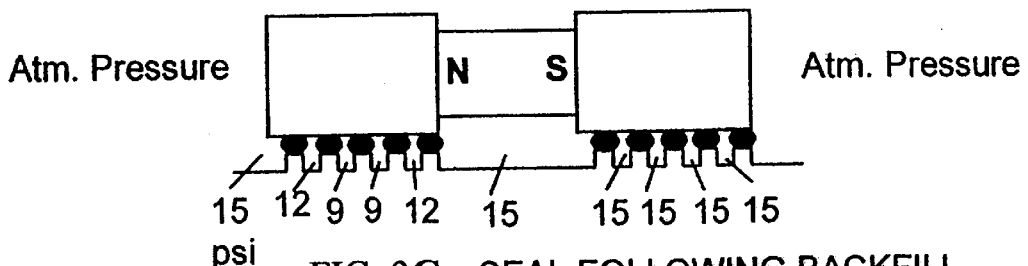
FIG. 3C – SEAL FOLLOWING BACKFILL
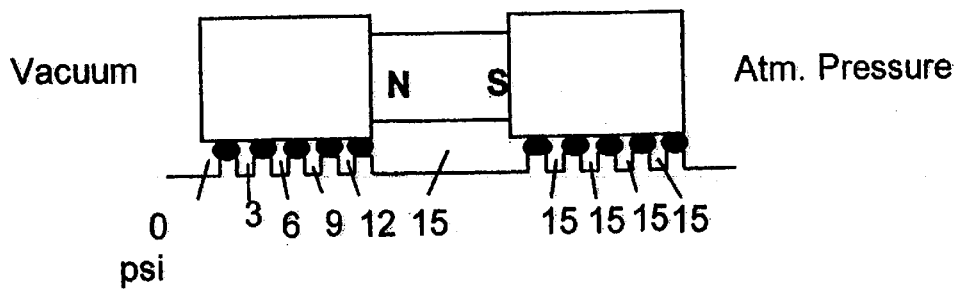
FIG. 3D – SEAL FOLLOWING NEXT PUMPDOWN

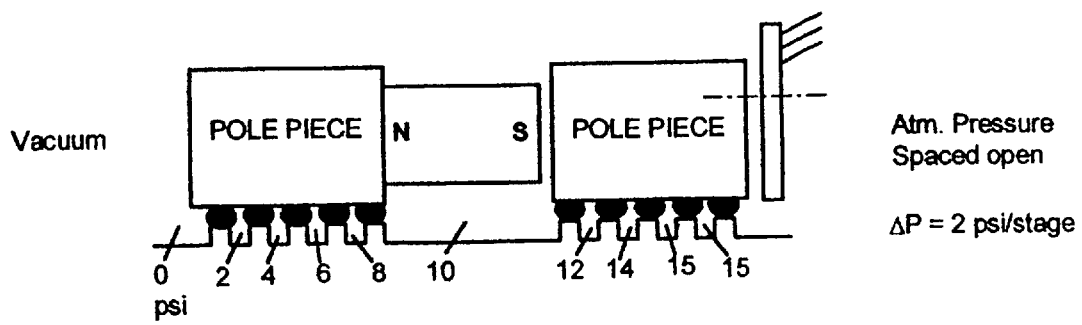
FIG. 5A – NONBURSTING SEAL FOLLOWING PUMPDOWN
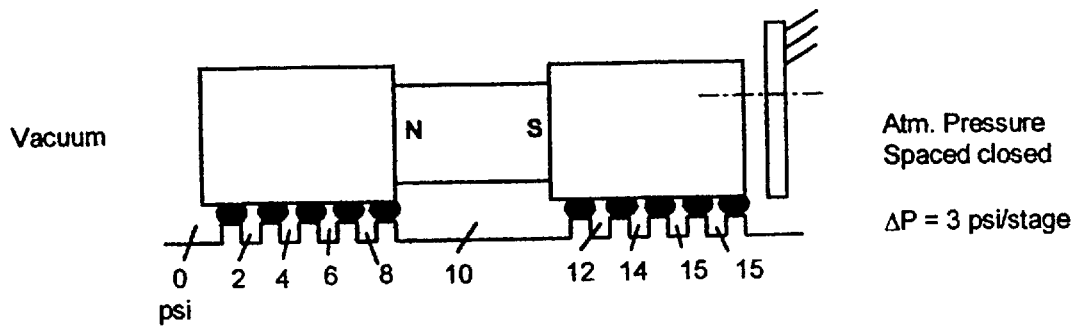
FIG. 5B – SEAL FOLLOWING MAGNETIC FIELD INTENSIFICATION
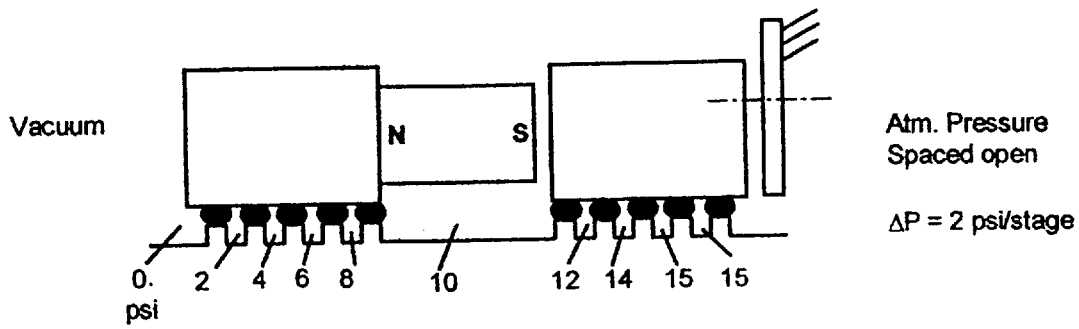
FIG. 5C – SEAL PRIOR TO BACKFILL
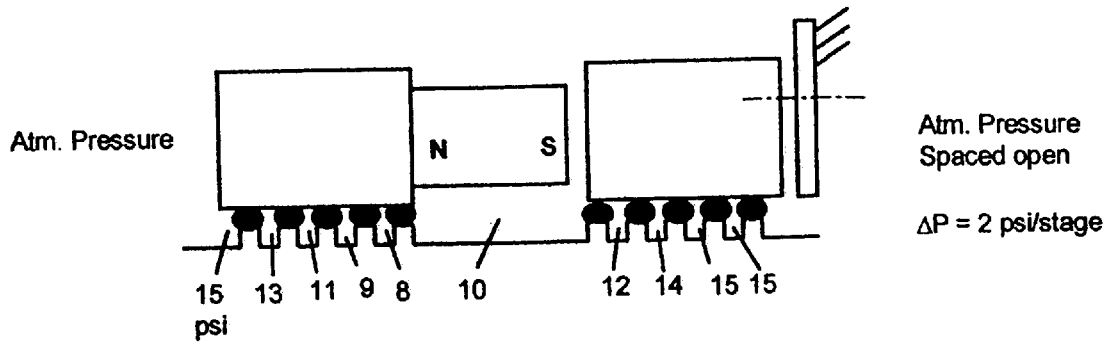
FIG. 5D – SEAL FOLLOWING BACKFILL

NON-BURSTING FERROFLUID SEAL

FIELD OF THE INVENTION

This invention relates to magnetic fluid rotary seals designed to provide a pressure barrier in a variable pressure environment, and, more particularly, to magnetic fluid seals designed to prevent bursting during operation.

BACKGROUND OF THE INVENTION

Magnetic fluid rotary seals have been used for many years in different environments. The prototypical seal device of this type is described in U.S. Pat. No. 3,620,584. A comprehensive review describing numerous applications and modifications of the seal is presented in Chapter 5 authored by Kuldip Raj in *Magnetic Fluids and Applications Handbook*, B. Berkovski, Ed., Begell House, Inc., New York (1996). A treatment describing the synthesis, make-up, fluid and magnetic properties, and flow of magnetic fluids is given in the monograph *Ferrohydrodynamics*, R. E. Rosensweig, Cambridge University Press, New York (1985), reprinted by Dover Publications, Inc., Mineola, N.Y. (1997).

As stated in the aforementioned publications, and as used herein, a magnetic fluid is an ultra-stable colloidal dispersion of approximately 10 nm size magnetic particles in a liquid carrier. Such colloidal magnetic fluids are also known as "ferrofluids." The particles are sufficiently small that they are prevented from settling in gravitational or magnetic fields by thermal motion. A surface coating of adsorbed surfactant(s) or electric charges prevents agglomeration of particles to one another so that the colloids are stable over a long period of time.

Such a fluid may be used to create a gas tight seal. In prior art seal devices, magnetic fluid is retained as a ring in a gap, for example, a gap surrounding a cylindrical rotating shaft, by a magnetic field in the gap. The magnetic fluid serves as a barrier to the passage of gas along the shaft while permitting rapid rotation of the shaft, if desired. For a given magnetic field, the amount of pressure differential across the fluid ring that the seal can support is primarily determined by the magnetic field intensity in the gap.

FIG. 1 illustrates components and magnetic field lines of such a conventional magnetic fluid seal having permanent magnet 1 with annular, permeable pole pieces 2 and 8 defining gaps, such as gaps 3 and 7, between pole pieces 2 and 8 and permeable rotating shaft 4. Magnetic lines of flux 5 circulate through the magnetic circuit formed by magnet 1, pole piece 2, gap 3, shaft 4, gap 7 and pole piece 8. The magnetic flux lines 5 concentrate to a high intensity in the gaps defined by a tooth, such as tooth 6. Magnetic fluid is magnetically retained in discrete rings such as rings 9, 11 and 13 circling the shaft 4 and bridging the gaps 3 and 7 between teeth and a pole piece.

The rings 9, 11 and 13 of magnetic fluid prevent the flow of gas under pressure from a region 14 to a lower pressure region 15. A ring of magnetic fluid is referred to as a seal "stage." The seal stages are separated by gas filled interstage regions, such as regions 10 and 12. In variations of this conventional seal, the teeth may be recessed in the shaft rather than extending from the surface, teeth may be located on a pole block opposite the smooth surface of a shaft, teeth may be present at the gaps of both pole blocks, teeth may be tapered or otherwise shaped, and multiple magnets may be employed. For simplicity, FIG. 1 omits bearings supporting the shaft, housing, static seals, retaining rings, etc. that are part of a total seal package, as these elements are well known to one skilled in the art.

In magnetic fluid seals, the magnetic field intensity in the gaps is, in turn, determined by the configuration of the magnetic circuit that generates the field. The intensity of magnetic field established in the gap depends on the magnetomotive force of the magnet and the magnetic reluctance of the magnetic circuit elements and is analogous to the flow of current in a resistive electrical circuit containing a source of electromotive force, as is well known in the design of magnetic and electrical systems. In conventional seals, the magnetic circuit insures that the seals operate with a constant magnetic field in the seal gaps.

A single fluid ring, which constitutes one stage, can withstand only a limited pressure differential, and when this differential is exceeded, the ring "bursts." When a burst occurs, a leakage path develops through the fluid ring and allows gas to pass by the seal. This process is illustrated in FIGS. 2A–C. As shown in FIG. 2A, with no pressure differential across the stage, the cross-section of a ring of magnetic fluid is symmetrically positioned, bridging the gap between a pole piece and the shaft. When a pressure differential is applied across the seal stage, the ring of fluid is displaced toward the low-pressure side as shown in FIG. 2B. Due to fringing, magnetic field intensity is weakest at the shaft surface. When the pressure difference is excessive, a leakage path opens up adjacent to the shaft surface with the magnetic fluid lifted away from the surface. The bursting condition is illustrated in FIG. 2C.

Accordingly, a seal designed to support a high-pressure differential is typically equipped with multiple stages of rings arranged in series longitudinally on the shaft. Upon initial exposure to the pressure differential, the outer seal rings are exposed to large pressure differences and a seal ring may burst temporarily and distribute excess pressure to the next stage. When pressure-holding capacity of that next stage is exceeded, the ring associated with that stage bursts and permits transfer of gas to the subsequent stage. This process continues until the seal stages reach equilibrium.

After a seal stage bursts, the pressure difference across the seal stage is reduced and the integrity of the fluid ring in that stage is restored as the fluid in the gap reseals itself. Thus, after the initial application of pressure across the seal, the seal stages will reach equilibrium and reseal them selves. However, each seal stage that has burst will subsequently operate near its burst condition. Later, if a pressure fluctuation occurs that increases the pressure difference across a stage, or if a condition develops that decreases the pressure holding capacity of a stage (for mechanical, thermal, magnetic or other reasons), the seal stage may burst during operation. This second burst may then release a volume of gas trapped in the interstage region into a process chamber, e.g. a vacuum chamber in which integrated circuits are fabricated and the gas can be detrimental to the processing operation.

FIGS. 3A–3D illustrate the interstage pressurization conditions in a conventional magnetic fluid seal used in a material processing system. The figures show the seal during sequential processing steps in an environment where the pressure varies between vacuum and atmospheric pressure. FIG. 3A depicts the seal prior to establishing vacuum at one end. The interstage regions all hold air at one atmosphere pressure. The distribution of interstage pressurization after pumpdown is illustrated in FIG. 3B. Typically, about 3 psi of pressure differential is established across each seal stage that previously has burst and resealed as discussed in relation to FIG. 2. A number of stages remain in the unburst condition with no pressure difference across them. They furnish a reserve or margin of safety and ensure long life of the seal should magnetic fluid evaporate or otherwise be removed from the working stages. During the course of processing, the vacuum vessel may be backfilled, or re-pressurized, in order to remove processed material. FIG. 3C illustrates the distribution of interstage pressures following a backfill. Following a subsequent pumpdown, the interstage pressurizations return to their previous pumped down values as shown in FIG. 3D. It will be understood that the pressure changes presented are notional and intended for illustration only, and may not coincide with conditions in an actual seal device.

Prior-art, conventional magnetic fluid seals employed in high-vacuum systems, typically those of $10^{-6}$ Torr or higher vacuum, either under static or dynamic conditions, may permit a burst of air through the seal and its introduction into the vacuum system. The burst of air occurs intermittently, depending on the seal design, the amount of magnetic fluid in the seal, and operating conditions. For example, when the magnetic fluid seal is started or is employed for the first time after being in a static condition, a burst of air is usually introduced into the vacuum system. In modern, high-vacuum processing systems, these air bursts present limitations on the employment of magnetic fluid multiple-stage seals. A detailed discussion of these aspects may be found in U.S. Pat. No. 4,407,518.

Several prior art attempts have been made to solve the bursting problem. For example U.S. Pat. No. 4,407,518 discloses a non-bursting multiple-stage seal and system in which pumping with pressure monitoring is employed to maintain the differential pressure across the end stage nearest the vacuum chamber at a predetermined level sufficient to prevent the stage from bursting. Often a separate vacuum pump is required in addition to a pressure sensor, feedback control, and conduits. Accordingly, the system is relatively expensive and subject to maintenance and down time.

U.S. Pat. No. 4,445,696 describes a magnetic fluid seal having the goal of non-bursting operation. All the seal stages are located on the atmospheric side of the magnet, and on the vacuum side of the magnet, the space between shaft and pole block is made very small so that flow through it, if any occurs, takes place slowly. Thus, the patent provides for a reduced flow rate of leakage gas into the vacuum vessel in the event of a burst. While this seal minimizes the impact of a burst, it does not prevent bursts.

U.S. Pat. No. 4,605,233 discloses a magnetic fluid rotary seal employing a multiplicity of permanent magnets disposed in magnetic opposition to each other that drive flux through pole pieces located in-between. The stage nearest the vacuum side is configured to withstand a larger pressure differential than the other stages of the seal. However, the design is no better suited for vacuum sealing than a conventional magnetic fluid seal as the stage nearest the vacuum end must burst and reseal to establish initial operation, and hence operates near its burst condition.

U.S. Pat. No. 5,340,122 describes another form of differentially-pumped magnetic fluid seal in which the bearings supporting the shaft are isolated from exposure to the vacuum chamber thus preventing contamination of the chamber due to outgasing of bearing materials. A multistage seal withstands rough-vacuum/atmosphere pressure differential while a separate,.one stage seal containing its own magnet source is operated with pressure differential of high-vacuum/rough vacuum. A space between the two seal regions is evacuated with a roughing pump to ensure the presence of a small pressure difference across the single stage seal that therefore is prevented from bursting. Again, a complex and expensive system is needed to achieve the benefits the device confers.

In view of the foregoing, it is desirable to achieve non-bursting performance of a magnetic fluid seal in an inexpensive, compact device.

SUMMARY OF THE INVENTION

In accordance with the principles of the invention, the magnetic field intensity in one or more of the seal gaps is varied in time. During the initial application of pressure across the seal, the magnetic field intensity is reduced, allowing the seal stages to burst and reach equilibrium. Thereafter, the magnetic field intensity is increased, in turn increasing the pressure capacity of each seal stage so that each seal stage is rendered non-bursting.

The magnetic field intensity in the seal gaps is controlled by changing the magnetic reluctance of the magnetic circuit that creates the field in the gaps. In one embodiment, a space is introduced between the magnet and one of the pole pieces in order to increase the magnetic reluctance. The lower intensity field in the seal gaps is established when the space is introduced and the higher intensity field is established when the space is removed.

Another embodiment changes the reluctance by changing the magnetic reluctance of one of the magnetic circuit elements. For example, the rotating shaft may be hollowed out to increase its magnetic reluctance. The lower intensity of magnetic field in the seal gaps results from a relatively large reluctance presented by the thin walls of the hollow shaft. In order to increase the field strength in the seal gaps, a flux intensifier comprising a soft ferromagnetic is inserted into the shaft. The flux intensifier reduces the magnetic circuit reluctance.

A further embodiment uses a flux diverter, for example, made of soft ferromagnetic material, placed across the magnet. A portion of the magnetic induction passing through the magnet runs through the diverter causing the magnet to operate at a lower coercivity that, in turn, reduces the intensity of magnetic field in the seal gaps. When the diverter is removed, the magnetic field intensity in the seal gaps increases. This embodiment is particularly useful with seals employing radially magnetized permanent magnets.

Still another embodiment of this invention uses a wound coil of electrical conductor configured to reduce the magnetomotive driving force in the magnetic circuit when current flows in the coil. The relatively low magnetic field intensity in the gaps is established when current flows and the higher magnetic intensity is established by switching the current off. This embodiment has the advantage that current need only be supplied to the coil during the short period when the seal is put into service. Subsequently, the seal may be operated in the nonbursting condition for any length of time.

BRIEF DESCRIPTION OF THE DRAWINGS

The above and further advantages of the invention may be better understood by referring to the following description in conjunction with the accompanying drawings in which:

FIGS. 2A–2C illustrate progressive deflection and ultimate bursting of a conventional seal stage in response to an increasing pressure difference across the stage.

FIGS. 3A–3D illustrate pressure distributions in the spaces between conventional seal stages during periods of stable (nonbursting) operating conditions.

FIGS. 5A–5D illustrate pressure distributions in the spaces between the seal stages of a seal constructed in accordance with the principles of this invention.

DETAILED DESCRIPTION

Figure 1:
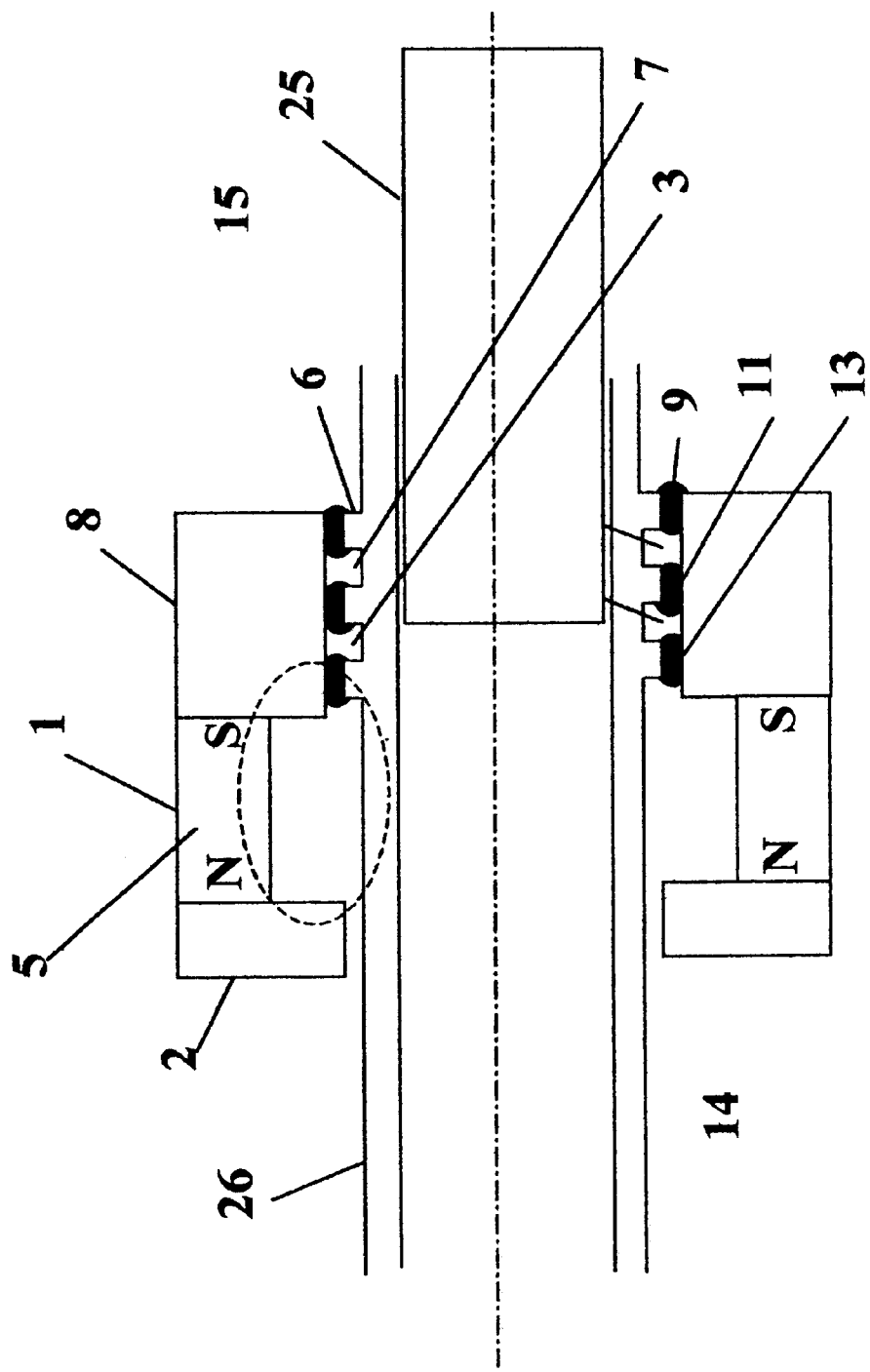
FIG. 1 illustrates components of a conventional magnetic fluid rotary seal.
Figure 4:
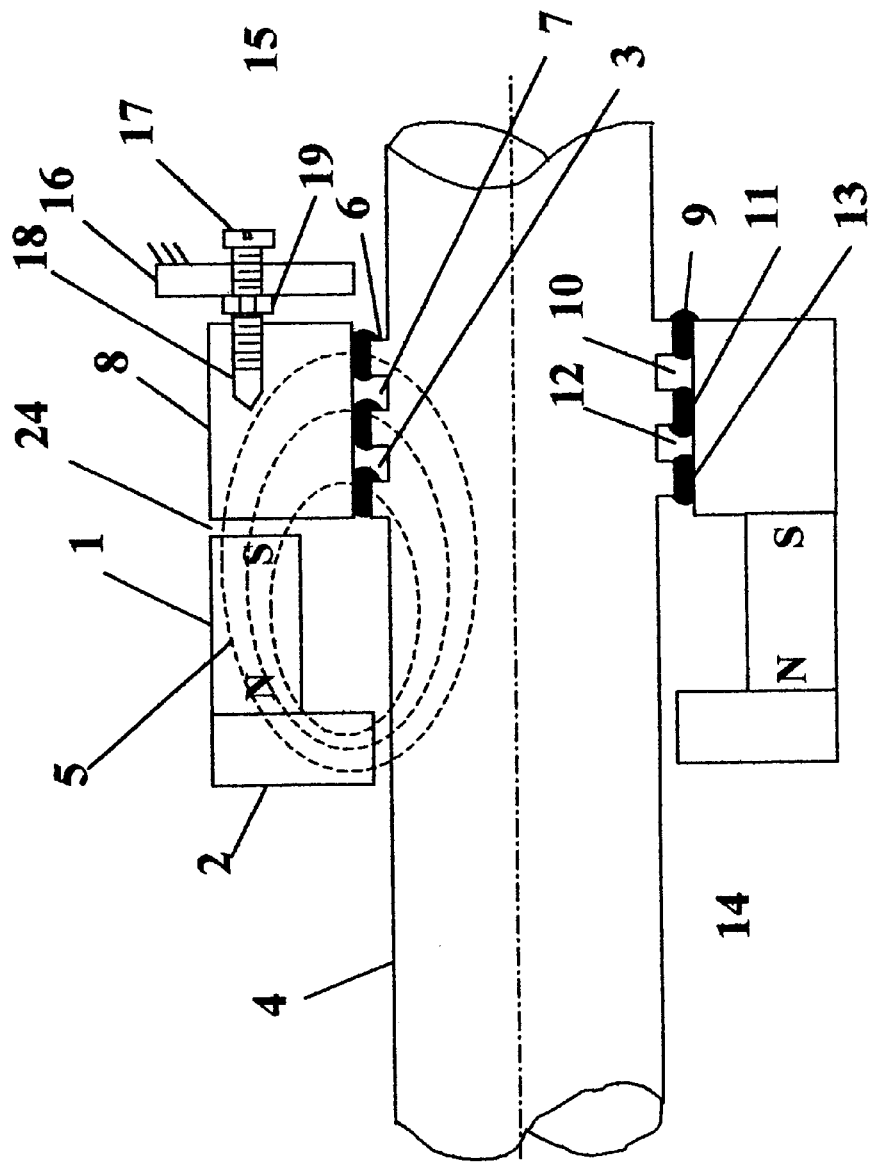
FIG. 4 is a view of a nonbursting seal embodiment utilizing a variable space between the permanent magnet and a pole piece.

Referring now to the drawings, like numerals are used throughout the various views to illustrate similar components. FIG. 4 illustrates an embodiment of a nonbursting seal constructed in accordance with the principles of this invention that utilizes a variable spacing 24 between one face of the permanent magnet 1 and a pole piece 8. The spacing is adjustable via a screw release mechanism made up of a plate 16 that is fixed to the seal housing, a machine screw 17 retained by a clip ring 19, and an internally threaded bore 18 mated to the screw 17.

Initially, the screw 17 is threaded sufficiently far into the threaded bore 18 to position and retain the pole piece 8 in the spaced-apart relationship to the magnet 1. The magnetic reluctance of the space 24 in the magnetic circuit weakens the field in the gaps at stages 9, 11 and 13 thus establishing a relative small burst pressure capability at each seal stage. Although three stages are shown in the figure, fewer or more stages may be incorporated in a seal constructed according to the invention.

When the ferromagnetic pole piece 8 is moved into contact with the face of magnet 1, the field in the gaps of the stages intensifies producing an increased burst pressure in each stage. In order to use this seal, the operating pressure difference is applied to the seal when the magnet and pole block are spaced apart, for example, during pumpdown. Subsequently, the magnet and pole block are brought into contact and maintained in contact, thus ensuring that the seal operates in the burst-free mode during processing.

Multiple screw releases may be arranged around the face of the seal so that the motion of the pole piece can be facilitated by rotating the order in which the screws are adjusted. It will be understood that one skilled in mechanical arts may devise alternate methods for positioning the pole piece that fall within the scope of this invention.

In a manner analogous to an electric circuit, the magnetic flux (which is analogous to electric current) in a magnetic circuit is inversely proportional to the reluctance (analogous to resistance in an electrical circuit) of the magnetic circuit. The reluctance, $R_g$, of the working gaps in the seal is approximately $R_g = I_g/A_g$, where $l_g$ is the width of the gap and $A_g$ is the surface area of the gap. Similarly, the reluctance of the space between the magnet face and the pole piece is $I_s/A_s$ where $I_s$ is the width of the space and $A_s$ is the surface area of the space. Assuming for simplicity that the magnetomotive force remains constant regardless of the gap and space widths and that the reluctance of any return seal gap is negligible, the ratio of gap field intensities is given by $H'_g/H_g = I_g A_s/(I_g A_s + I_s A_g)$ where $H_g$ is magnetic field in a working seal gap when a space is present between magnet 1 and pole piece 8, and $H_g$ is induction field in a seal gap when there is close contact of magnet 1 and pole piece 8.

Magnetic fluid seals are normally designed to operate with the magnetic fluid magnetically saturated in which case the pressure holding capacity of a stage is proportional to the intensity of the magnetic field in a stage. Accordingly, from the expression for the magnetic field ratio developed above, $\Delta p/\Delta p = I_g A_s/(I_g A_s + I_s A_g)$. This expression can be solved to determine the width of the space between the magnet 1 and the pole piece 8 necessary to achieve a non-bursting condition. As a numerical example, consider a seal with 20 stages. Let the seal gap of each stage $I_g = 0.005$ inch. The total seal area is $A_g = n\pi Dw$ with n=20 seal stages, D=1 inch (shaft diameter), w=0.05 inches (length of a stage). Thus, $A_g = 2\pi$ sq. in. For a magnet having a mean diameter of 2 inches with difference between inner and outer radius of 1 inch, $A_m = 2\pi$ sq. in. Specifying a pressure ratio of 2/3 and solving for spacing distance gives $I_s = 0.005$ inch which can be easily accommodated in a seal device.

FIGS. 5A–5D illustrate the pressure distributions in the spaces between the seal stages for a seal constructed in accordance with the principles of this invention. FIG. 5A illustrates conditions following a pumpdown when the interstage regions were initially at atmospheric pressure. During pumpdown, the movable pole piece is positioned out of contact with the magnet face at a predetermined separation distance sufficient to appreciably weaken the intensity of magnetic field in the gaps containing the rings of magnetic fluid. A nominal pressure holding capacity per resealed stage is indicated as 2 psi. In FIG. 5B, the adjustable pole piece has been moved into contact with the face of the permanent magnet, thereby increasing the pressure holding capacity of each seal, nominally to 3 psi in this example. In this condition, the seal is nonbursting as the pressure holding capacity of a given resealed stage is far removed from the burst value. Thus, the seal is stable against any normal fluctuation in operating conditions. The values of interstage pressures are unchanged.

In preparation for a backfill of the pressure vessel, the adjustable pole piece is moved out of contact with the permanent magnet as indicated in FIG. 5C. Again, the values of interstage pressure are unchanged. Following backfill, the pressure distribution changes to the values indicated in FIG. 5D. Because the movable pole piece is out of contact with the permanent magnet the pressure capacity per resealed stage is 2 psi. Then, following a subsequent pumpdown to vacuum, the system returns to the state depicted in FIG. 5A. The movable pole piece is then brought into contact with the magnet face causing magnetic intensification in the seal gaps as indicated in FIG. 5B. Operation can be repeated in this manner indefinitely.

Figure 6:
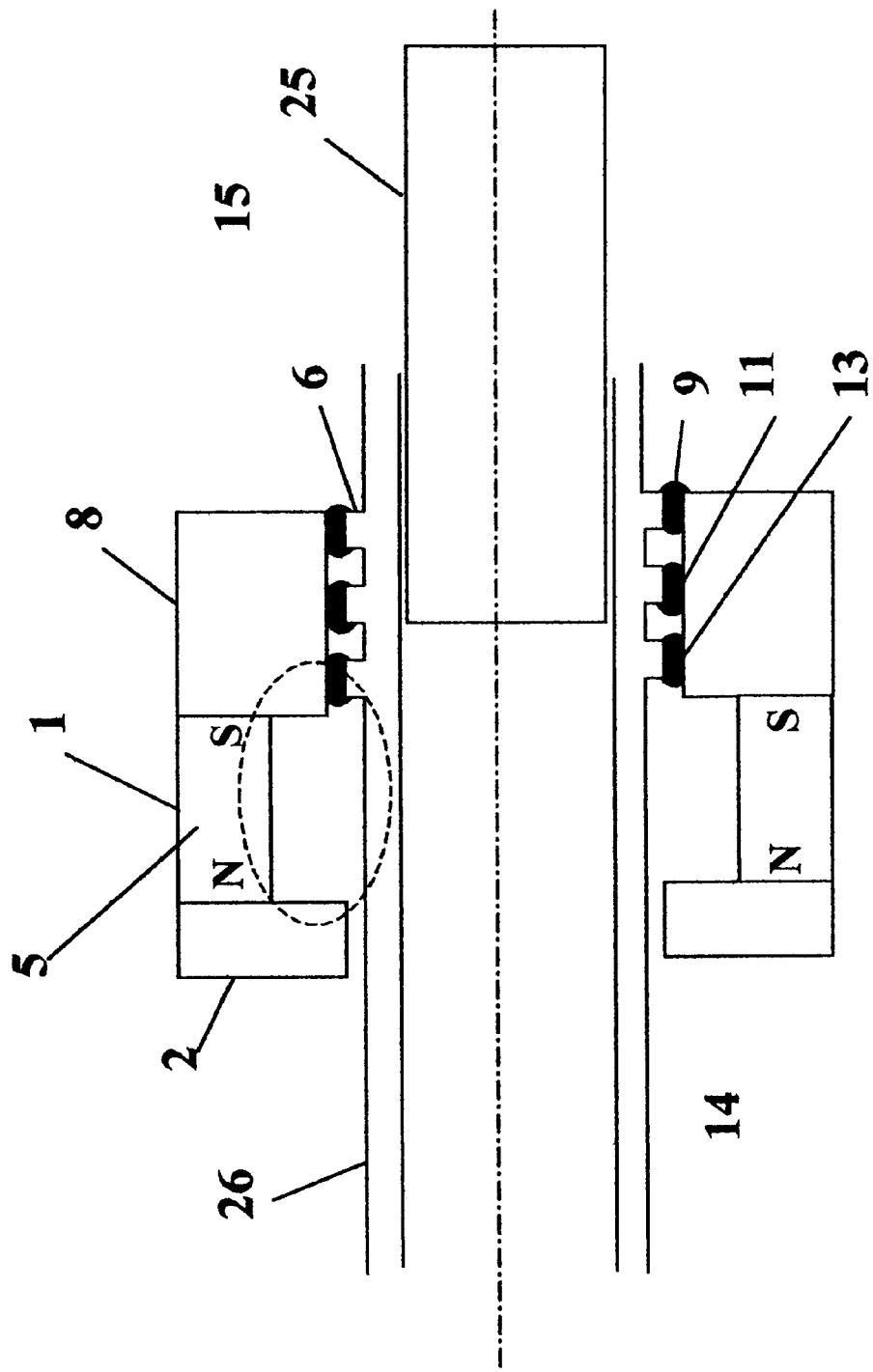
FIG. 6 is a view of a nonbursting seal embodiment utilizing a flux intensifier that fits into a hollow shaft. The intensifier can be fastened to the hollow shaft, if desired.

FIG. 6 illustrates an embodiment of a nonbursting seal constructed in accordance with the principles of this invention utilizing a flux intensifier 25 that fits into a hollow shaft 26 and fastens to the shaft. The wall thickness of the soft ferromagnetic shaft 26 is chosen such that, in the absence of the intensifier 25, the magnetic field intensity in the seal gap of a stage, such as stage 6, is relatively weak. The seal is placed in service with a pressure difference applied across it with the seal stages in the weakened condition. Subsequently, the soft ferromagnetic intensifier 25 is moved into the hollow shaft, thus increasing the burst pressure capability of each stage to a larger value. In this condition, each stage operates in a state removed from its burst condition and is stable against fluctuations, i.e., the seal becomes free of bursting.

It will be understood that the number and placement of stages shown in this figure is arbitrarily chosen, and that fewer or more stages may be configured adjacent to a given pole piece, that both pole pieces or either pole piece may support stages, and that the shape of a stage tooth can be other than shown.

Figure 7:
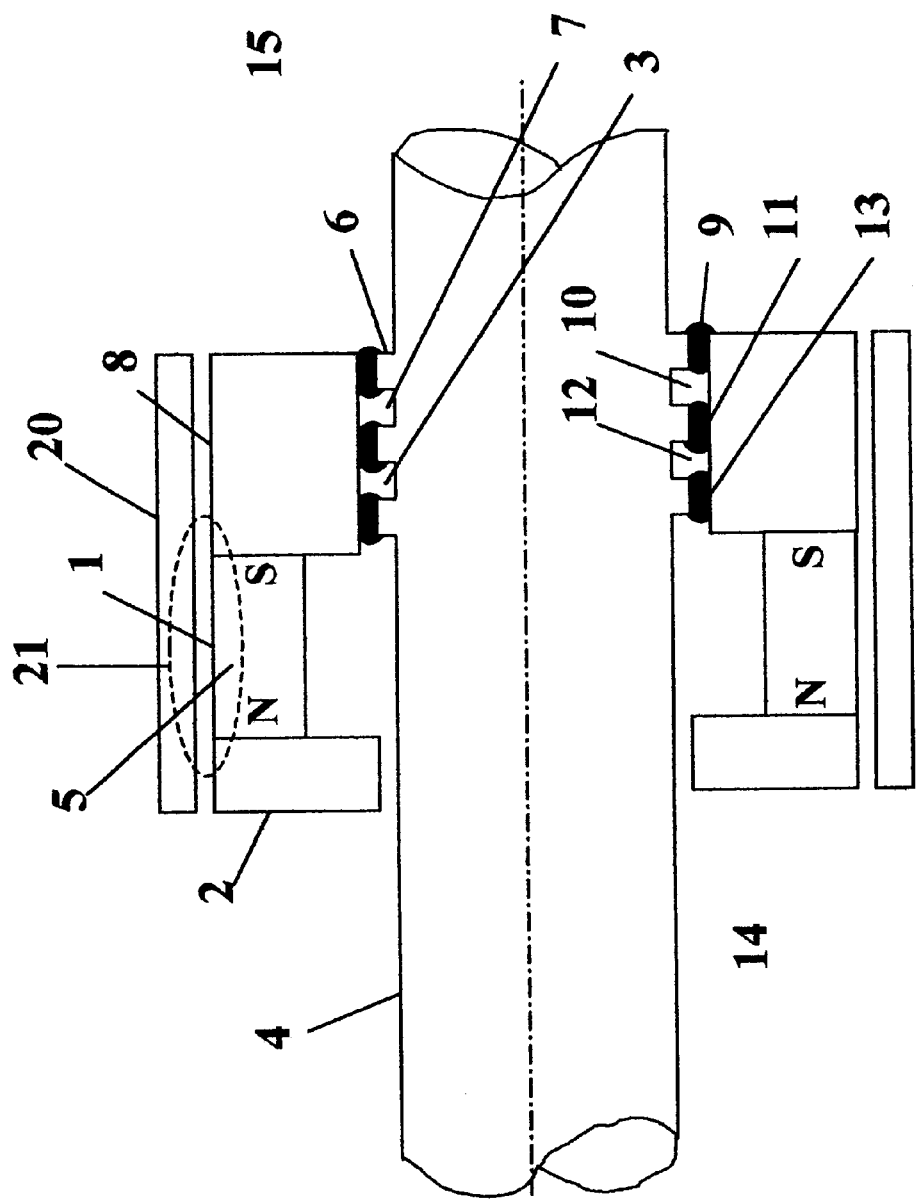
FIG. 7 is a view of a nonbursting seal embodiment utilizing a flux diverter that surrounds the housing and is removable from it.

FIG. 7 illustrates still another alternative embodiment of a nonbursting seal of this invention utilizing a flux diverter 20. The flux diverter 20 consists of a permeable sleeve that fits over the seal device. Generally, the diverter 20 will surround a housing (not shown) that encloses the seal components. The presence of the flux diverter furnishes a parallel path for the flux of field lines driven by the magnet 8. A portion 21 of the magnetic flux is thereby diverted causing the magnetic field intensity in the seal gaps of stages 9, 11 and 13 to weaken. The seal is put into service with the stages in the weakened condition. Subsequently, the flux diverter 20 is removed, causing the burst pressure in the stages to increase, thereby ensuring burst-free operation. This embodiment is particularly useful for retrofitting existing magnetic fluid seals. The utility of this embodiment is further enhanced by using a housing with a thinner than usual wall thickness.

Figure 8:
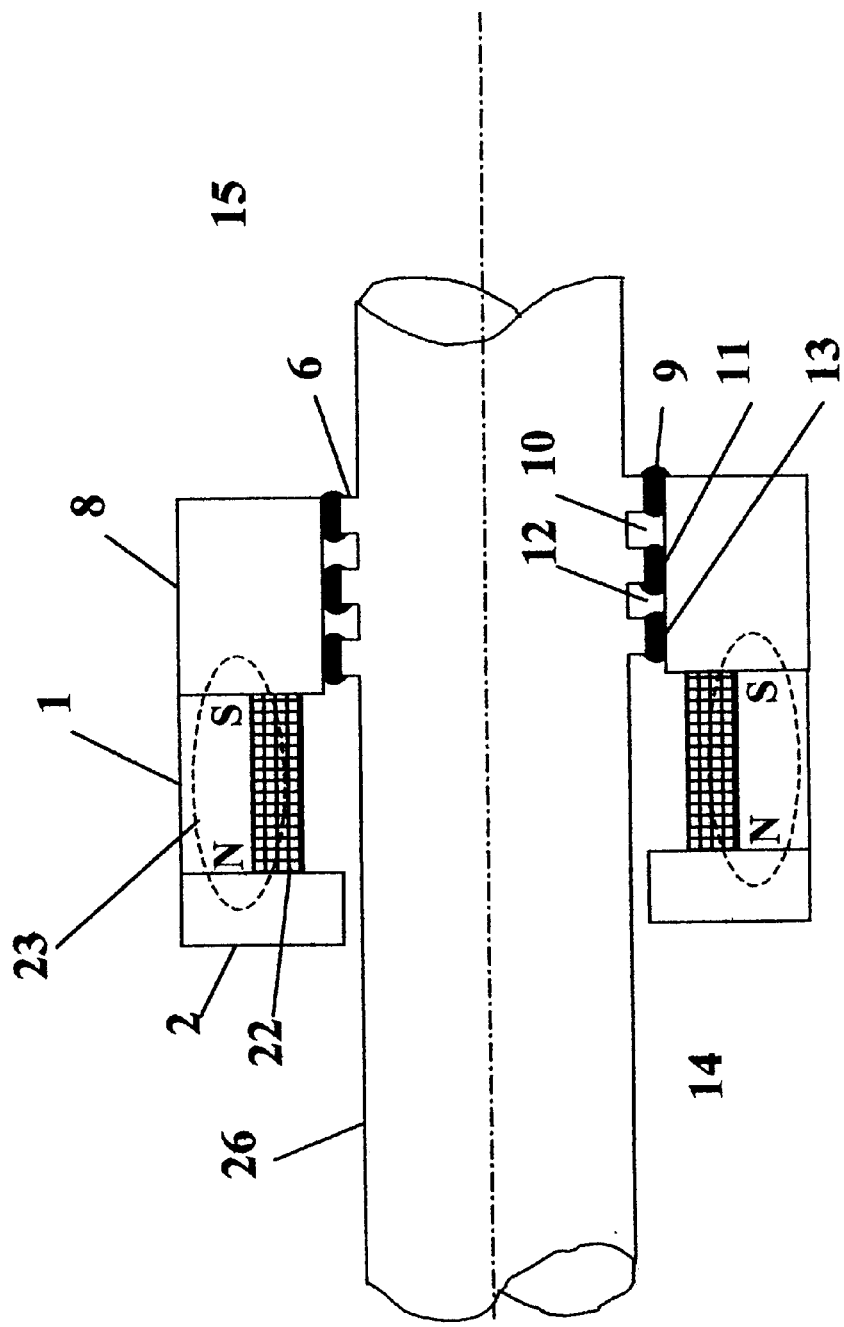
FIG. 8 is a view of a nonbursting seal embodiment utilizing a current-carrying wound coil disposed within the seal to oppose the magnetomotive force of the permanent magnet at startup.

FIG. 8 is a view of another embodiment of nonbursting seal constructed in accordance with the principles of this invention in which a current-carrying coil 22 produces a magnetomotive force in opposition to that produced by the permanent magnet 1. As the result, a portion 23 of the magnetic flux emerging from the permanent magnet 1 is rerouted, yielding a reduced field strength in the seal gaps of stages 9, 11 and 13. As with the previous embodiments, the seal is put into service with the stages in the weakened condition. Subsequently, the current in coil 22 is switched off, thereby restoring the field generated by magnet 1 to full strength and creating a higher burst pressure in the working seal stages. The seal becomes nonbursting as with the previous embodiments.

Although the embodiments described above each utilize a permanent magnet 1 having longitudinal magnetization, another type of magnetic fluid seal utilizes a radially polarized permanent magnet to achieve compact size in a multistage seal; see, for example, U.S. Pat. No. 4,526,382. In this seal design, magnetic flux is present in a series magnetic circuit comprising a permanent magnet, the seal housing, a magnetically permeable shaft, bearing, the magnetically permeable shaft, the teeth on the shaft defining working seal gaps and return to the permanent magnet. The hollow shaft embodiment illustrated in FIG. 6 may be used with this type of seal to yield nonbursting operation following the sequence of steps previously described.

The nonbursting seals of this invention are useful in sealing against a pressure difference in single or multiple-stage seals. Such seals may be used in vacuum sealing of rotating shafts, such as rotating X-ray anodes, blowers and compressors. The seals are also useful in rotary feedthroughs for vacuum service, seals for use in crystal growing furnaces, etc. A variety of magnetic fluids may be employed in the seals of this invention. Typical magnetic fluids include those having ferric induction (B–H) in gauss ranging from 200 to 1000; for example, 500 to 1000, and a viscosity of 50 centipoise to 900 centipoise; for example 50 to 300 cps at 27° C. The carrier liquid in the magnetic fluid generally comprises a nonvolatile liquid, such as a hydrocarbon, ester, silicone oil or other liquid carrier.

Those skilled in the art will readily appreciate that all embodiments and parameters listed herein are meant to be exemplary and actual embodiments and parameters will depend on specific applications for which the seal is being used. It is therefore to be understood that the foregoing embodiments are presented by way of example only and that, within the scope of the appended claims and equivalents thereto, the invention may be practiced otherwise than as specifically described.

What is claimed is:

1. A magnetic fluid seal having at least one seal stage including a seal gap with a magnetic field having an intensity therein, the seal being non-bursting after an initial application of a pressure differential across the seal, comprising:

a mechanism that reduces the magnetic field intensity in the seal gap during the initial application of the pressure differential across the seal so that the seal stage bursts and reaches equilibrium; and a mechanism that increases the magnetic field intensity in the seal gap operable only after the seal stage has reached equilibrium so that the pressure capacity of the seal stage is increased and the seal stage is rendered non-bursting.

2. The magnetic fluid seal of claim 1 wherein the magnetic field is created by a magnetic circuit having a reluctance and the magnetic field intensity reducing mechanism comprises a mechanism that increases the magnetic circuit reluctance.

3. The magnetic fluid seal of claim 2 wherein the mechanism that increases the magnetic circuit reluctance inserts an air gap into the magnetic circuit.

4. The magnetic fluid seal of claim 2 wherein the magnetic field intensity increasing mechanism comprises a mechanism that decreases the magnetic circuit reluctance.

5. The magnetic fluid seal of claim 4 wherein the magnetic circuit includes a portion with a magnetic reluctance and the mechanism that decreases the magnetic circuit reluctance comprises a mechanism for decreasing the magnetic reluctance of the portion.

6. The magnetic fluid seal of claim 1 wherein the magnetic field is created by a magnetic circuit including a magnet that develops a magnetic flux and the magnetic field intensity reducing mechanism comprises a flux diverter that diverts part of the magnetic flux away from the magnetic circuit.

7. The magnetic fluid seal of claim 1 wherein the magnetic field is created by a magnetic circuit including a first magnet that develops a first magnetic flux and the magnetic field intensity reducing mechanism comprises a second magnet that develops a second magnetic flux that opposes the first magnetic flux.

8. A magnetic fluid seal for forming a seal around a rotating shaft, the seal being non-bursting after an initial application of a pressure differential across the seal and comprising:

a magnet that develops a magnetic flux;

a pole piece in magnetic contact with the magnet, the pole piece forming a seal stage including a seal gap with a magnetic field having an intensity therein;

a magnetic fluid in the seal gap;

a mechanism that reduces the magnetic field intensity in the seal gap during the initial application of the pressure differential across the seal so that the seal stage bursts and reaches equilibrium; and a mechanism that increases the magnetic field intensity in the seal gap operable only after the seal stage has reached equilibrium so that the pressure capacity of the seal stage is increased and the seal stage is rendered non-bursting.

9. The magnetic fluid seal of claim 8 wherein the magnetic field intensity reducing mechanism comprises a mechanism that inserts an air gap between the magnet and the pole piece.

10. The magnetic fluid seal of claim 9 wherein the mechanism that inserts the air gap between the magnet and the pole piece is a screw mechanism that moves the pole piece away from the magnet.

11. The magnetic fluid seal of claim 10 wherein the magnetic field intensity increasing mechanism comprises a screw mechanism that moves the pole piece towards the magnet.

12. The magnetic fluid seal of claim 8 wherein the magnetic field intensity reducing mechanism comprises a shaft that is sufficiently hollow in the vicinity of the seal gap that the magnetic reluctance of the shaft is increased and the intensity of the magnetic field in the seal gap is reduced.

13. The magnetic fluid seal of claim 12 wherein the magnetic field intensity increasing mechanism comprises a magnetically permeable shaft insert and a mechanism for placing the insert into the hollow shaft so that the magnetic reluctance of the shaft is reduced and the magnetic field intensity in the seal gap is increased.

14. The magnetic fluid seal of claim 8 wherein the magnetic field in the seal gap is created by a magnetic circuit including the magnet and the magnetic field intensity reducing mechanism comprises a flux diverter that diverts part of the magnetic flux developed by the magnet away from the magnetic circuit.

15. The magnetic fluid seal of claim 14 wherein the flux diverter is a magnetically permeable sleeve that surrounds the magnet and the pole piece.

16. The magnetic fluid seal of claim 8 wherein the magnetic field intensity reducing mechanism comprises a second magnet that develops a second magnetic flux that opposes the magnetic flux.

17. The magnetic fluid seal of claim 16 wherein the second magnet is an electromagnet.

18. The magnetic fluid seal of claim 16 wherein the second magnet is a permanent magnet.

19. A method for operating a magnetic fluid seal having at least one seal stage including a seal gap with a magnetic field having an intensity therein, so that the seal is non-bursting after an initial application of a pressure differential across the seal, the method comprising:

(a) reducing the magnetic field intensity in the seal gap during the initial application of the pressure differential across the seal so that the seal stage bursts and reaches equilibrium; and (b) increasing the magnetic field intensity in the seal gap only after the seal stage has reached equilibrium so that the pressure capacity of the seal stage is increased and the seal stage is rendered non-bursting.

20. The method of claim 19 wherein the magnetic field is created by a magnetic circuit having a reluctance and step (a) comprises:

(a1) increasing the magnetic circuit reluctance.

21. The method of claim 20 wherein step (a1) comprises inserting an air gap into the magnetic circuit.

22. The method of claim 20 wherein the magnetic circuit includes a rotatable shaft and step (a1) comprises hollowing out the rotating shaft to increase the magnetic reluctance of the shaft.

23. The method of claim 20 wherein step (b) comprises:

(b1) decreasing the magnetic circuit reluctance.

24. The method of claim 23 wherein the magnetic circuit includes a hollow rotating shaft and step (b1) comprises placing a magnetically permeable insert into the hollow shaft to decrease the magnetic reluctance of the shaft.

25. The method of claim 19 wherein the magnetic field is created by a magnetic circuit including magnet that develops a magnetic flux and step (a) comprises diverting part of the magnetic flux away from the magnetic circuit.

26. The method of claim 19 wherein the magnetic field is created by a magnetic circuit including magnet that develops a first magnetic flux and step (a) comprises placing a second magnet that superposes a second magnetic flux in the magnetic circuit, the second magnetic flux opposing the first magnetic flux.

27. The method of claim 26 wherein the second magnet is an electromagnet that has a current flowing therethrough.

28. The method of claim 27 wherein step (b) comprises interrupting the current flow in the electromagnet.

* * * * *